United States Patent
Gledhill, III et al.

(10) Patent No.: US 11,485,653 B2
(45) Date of Patent: Nov. 1, 2022

(54) METHODS OF METERING DELIVERY OF CAUSTIC SODA FOR TREATMENT OF WATER

(71) Applicant: BLUE-WHITE INDUSTRIES, LTD., Huntington Beach, CA (US)

(72) Inventors: Robert E. Gledhill, III, Huntington Beach, CA (US); John T. Nguyen, Fountain Valley, CA (US); Steven Lee Smith, Costa Mesa, CA (US)

(73) Assignee: Blue-White Industries, Ltd., Huntington Beach, CA (US)

( * ) Notice: Subject to any disclaimer, the term of this patent is extended or adjusted under 35 U.S.C. 154(b) by 0 days.

(21) Appl. No.: 16/987,968

(22) Filed: Aug. 7, 2020

(65) Prior Publication Data
US 2021/0047209 A1    Feb. 18, 2021

Related U.S. Application Data (60) Provisional application No. 62/886,213, filed on Aug. 13, 2019.

(51) Int. Cl.
  *C02F 1/68* (2006.01)
  *C08F 210/18* (2006.01)
  *F04B 45/04* (2006.01)
  *F04B 15/02* (2006.01)

(52) U.S. Cl.
  CPC ............ *C02F 1/686* (2013.01); *C08F 210/18* (2013.01); *F04B 15/02* (2013.01); *F04B 45/04* (2013.01); *C02F 2303/08* (2013.01)

(58) Field of Classification Search
  CPC .... C02F 1/686; C02F 1/66; C02F 1/68; C02F 2303/08; C02F 2103/02; C02F 2101/20; C08F 210/18; F04B 15/02; F04B 15/04; F04B 45/04; F04B 43/0054; F04B 43/02; F04B 13/00
  USPC ........................................................ 210/749
  See application file for complete search history.

(56) References Cited

U.S. PATENT DOCUMENTS

| | | |
|---|---|---|
| 7,001,153 B2 | 2/2006 | McDowell et al. |
| 7,284,964 B2 | 10/2007 | McDowell et al. |
| 8,215,931 B2 | 7/2012 | McDowell et al. |
| 8,418,364 B2 | 4/2013 | McDowell et al. |

(Continued)

OTHER PUBLICATIONS

Dobbs, G., "How to Select Diaphragms for AODD Pumps—Part 2 of 2", https://modernpumpingtoday.com/select-diaphragms-aodd-pumps-2/, [accessed Feb. 9, 2021], 5 pages.

(Continued)

*Primary Examiner* — Akash K Varma
(74) *Attorney, Agent, or Firm* — Knobbe, Martens, Olson & Bear, LLP (57) ABSTRACT

Described is a method for treating water with sodium hydroxide. The method can increase the accuracy of the volume of a stock sodium hydroxide solution that is delivered to the water being treated. The method can include pumping a concentrated aqueous sodium hydroxide stock solution with a diaphragm pumping system that has a two-part diaphragm assembly with a polymeric diaphragm overmolded onto a rigid insert. The polymeric diaphragm can be made of a fully-vulcanized ethylene propylene diene monomer rubber that is injection molded over the rigid insert.

10 Claims, 5 Drawing Sheets

(56) References Cited

U.S. PATENT DOCUMENTS

| | | | |
|---|---|---|---|
| 8,639,363 | B2 | 1/2014 | Gledhill, III et al. |
| 9,374,024 | B2 | 6/2016 | Nguyen et al. |
| 9,389,109 | B2 | 7/2016 | Gledhill, III et al. |
| 9,777,720 | B2 | 10/2017 | Gledhill, III et al. |
| 9,828,984 | B2 | 11/2017 | Gledhill, III et al. |
| 9,909,579 | B2 | 3/2018 | Gledhill, III et al. |
| 9,996,089 | B2 | 6/2018 | Gledhill, III et al. |
| 10,330,094 | B2 | 6/2019 | Gledhill, III et al. |
| 10,948,320 | B2 | 3/2021 | Gledhill, III et al. |
| 11,131,300 | B2 | 9/2021 | Gledhill, III et al. |
| 11,150,118 | B2 | 10/2021 | Gledhill, III et al. |
| 11,221,004 | B2 | 1/2022 | Gledhill, III et al. |
| 2005/0249610 | A1* | 11/2005 | Fischer ............... F04B 43/026 417/360 |
| 2010/0005655 | A1 | 1/2010 | Nguyen |
| 2011/0180172 | A1 | 7/2011 | Gledhill, III et al. |
| 2015/0056089 | A1* | 2/2015 | Gledhill, III ...... B29C 45/14311 417/472 |
| 2015/0211509 | A1 | 7/2015 | Gledhill, III et al. |
| 2018/0087942 | A1 | 5/2018 | Gledhill, III et al. |
| 2018/0291886 | A1 | 10/2018 | Gledhill, III et al. |
| 2018/0298891 | A1 | 10/2018 | Gledhill, III et al. |
| 2019/0017499 | A1 | 1/2019 | Gledhill, III et al. |
| 2019/0234394 | A1 | 8/2019 | Gledhill, III et al. |
| 2020/0149522 | A1 | 5/2020 | Gledhill, III et al. |
| 2020/0386593 | A1 | 12/2020 | Nguyen et al. |
| 2021/0054963 | A1 | 2/2021 | Nguyen et al. |
| 2021/0064735 | A1 | 3/2021 | Gledhill, III et al. |
| 2021/0324845 | A1 | 10/2021 | Nguyen et al. |
| 2021/0348602 | A1 | 11/2021 | Nguyen et al. |
| 2022/0034693 | A1 | 2/2022 | Gledhill, III et al. |

OTHER PUBLICATIONS

Kelco, "Chemical Compatibility Chart Santoprene (TPE)", https://www.kelco.com.au/wp-content/uploads/2009/02/santoprene-compatibility-guide.pdf, [accessed Feb. 9, 2021], 4 pages.

Kerr Wood Leidal, "Water Distribution Corrosion Study", Nov. 2015, https://www.whistler.ca/sites/default/files/2018/Jul/bid-opportunity/pdf/25076/waterdistributioncorrosionstudy.pdf, [accessed Feb. 9, 2021], 65 pages.

* cited by examiner

| Temperature | | Viscosity (cP) at Concentration of Aqueous NaOH | | | | | | |
|---|---|---|---|---|---|---|---|---|
| (°C) | (°F) | 0% | 5% | 10% | 20% | 30% | 40% | 50% |
| 20 | 68 | 1.0 | 1.3 | 1.9 | 4.4 | 12.6 | 38.1 | 112 |
| 30 | 86 | 0.80 | 1.03 | 1.43 | 3.2 | 8.4 | 21.8 | 67.4 |
| 40 | 104 | 0.65 | 0.83 | 1.14 | 2.4 | 6.0 | 13.5 | 41.4 |
| 50 | 122 | 0.55 | 0.69 | 0.93 | 1.9 | 4.4 | 9.0 | 25.9 |
| 60 | 140 | 0.47 | 0.58 | 0.78 | 1.6 | 3.3 | 6.4 | 16.4 |

METHODS OF METERING DELIVERY OF CAUSTIC SODA FOR TREATMENT OF WATER

INCORPORATION BY REFERENCE TO ANY PRIORITY APPLICATIONS

This application claims priority to U.S. Provisional Application No. 62/886,213, filed Aug. 13, 2019, and entitled "METHODS OF METERING DELIVERY OF CAUSTIC SODA FOR TREATMENT OF WATER," the disclosure of which is hereby incorporated by reference in its entirety.

BACKGROUND

Field

The present disclosure relates generally to methods and systems for metering the delivery of caustic soda to drinking water.

Description of the Related Art

Sodium hydroxide (NaOH) is also known as lye and caustic soda. NaOH is a strong base and can be used to increase the alkalinity of a solution. NaOH can be used to raise the pH of water supplies, making the water less corrosive to plumbing and reduce the amount of metals (e.g., lead, copper) that can dissolve into drinking water. NaOH is highly soluble in water and absorbs moisture from air. At least in part due to the reactivity of NaOH with air, NaOH can be easier to handle in solution. It is desirable to precisely meter the amount of NaOH that is added to drinking water when NaOH is used to treat drinking water.

Positive displacement pumps, such as metering pumps, can be used to pump liquids at adjustable flow rates which are precise when averaged over time. Metering pumps include diaphragm metering pumps, peristaltic metering pumps, piston pumps, etc. A metering pump can be useful for measuring a precise volume of liquid in a specified time, thus having an accurate flow rate. Metering pumps can pump water, as well as other chemicals, solutions, and liquids. Metering pumps can be used in high discharge pressure applications.

SUMMARY

Disclosed herein are embodiments of a method for metering a volumetric delivery of caustic soda to a volume of water in order to treat the water with caustic soda. In some aspects, the methods disclosed herein are particularly suitable for use in the accurate volumetric delivery of a concentrated sodium hydroxide solution in water. In some aspects, the methods can be used to deliver sodium hydroxide to treat drinking water. The method can employ a pumping system comprising a two-part diaphragm assembly having an insert sealed within a polymer that is overmolded onto the insert. In some aspects, the method can comprise providing a NaOH stock solution comprising NaOH in water at a NaOH concentration of 5%, 10%, 20%, 30%, 40%, 50%, 70%; delivering a volume of the stock solution to a volume of drinking water wherein delivering comprises pumping the stock solution with a diaphragm assembly comprising a diaphragm made of a thermoplastic vulcanizate (e.g., Santoprene™).

In some aspects, a method for treating water with sodium hydroxide is provided. The method can include providing a stock solution of sodium hydroxide, wherein the stock solution has a concentration of sodium hydroxide between 10% and 70% in water; bringing the stock solution into contact with a fully-vulcanized ethylene propylene diene monomer (EPDM) rubber, wherein the EPDM rubber has a density of 0.96 grams per cubic centimeter, a Shore Hardness (Shore A, 23° C.) of 93, a tensile stress at 100% (across flow, 23° C.) of 7.10 MPa, a tensile strength at break (across flow, 23° C.) of 17.6 MPa, an elongation at break (across flow, 23° C.) of 580%, a tear strength (across flow, 23° C., Die C) of 54 kN per meter, a compression set (70° C., 22 hour, Type 1) of 36%, and a brittleness temperature of −54° C.; and pumping the stock solution with the EPDM rubber to deliver a volume of the stock solution into a volume of drinking water, thereby treating the drinking water with sodium hydroxide.

In some aspects, a method for treating water with sodium hydroxide is provided. The method can include providing a stock solution of sodium hydroxide, wherein the stock solution has a concentration of sodium hydroxide between 10% and 70% in water; bringing the stock solution into contact with a polymeric diaphragm, wherein the polymeric diaphragm comprises a fully-vulcanized ethylene propylene diene monomer (EPDM) rubber overmolded onto a rigid insert; and pumping the stock solution with the polymeric diaphragm to deliver a volume of the stock solution into a volume of drinking water, thereby treating the drinking water with sodium hydroxide.

In some aspects, a method for treating water with sodium hydroxide is provided. The method can include pumping a stock solution of NaOH with a diaphragm pumping system that includes a diaphragm assembly comprising a polymer diaphragm overmolded onto a rigid insert. In some aspects, the polymer diaphragm can be made of a material that can tolerate a NaOH concentration above 50% (e.g., 70% NaOH). In some aspects, the polymer diaphragm can be made of a fully-vulcanized ethylene propylene diene monomer (EPDM) rubber (e.g., Santoprene™ 271-87).

BRIEF DESCRIPTION OF THE DRAWINGS

Aspects of the present disclosure are described with reference to the accompanying drawings, in which like reference characters reference like elements, and wherein.

DETAILED DESCRIPTION

As discussed, NaOH can be added to drinking water to make the treated water less corrosive to plumbing and reduce the amount of metals (e.g., lead, copper) that can dissolve into the treated drinking water. When drinking water is treated with NaOH, it can be desirable to precisely meter the amount of NaOH that is added to the drinking water. Disclosed herein are embodiments of a method for metering the volumetric delivery of NaOH, particularly for use in the treatment of drinking water with NaOH. In some aspects, the method uses a diaphragm assembly to pump a stock solution of NaOH into a volume of water. In some aspects, the diaphragm assembly can comprise a diaphragm comprising an overmolded chemically-inert polymeric outer portion that completely covers a rigid insert. As discussed herein, the rigid insert can improve the durability and performance accuracy of the diaphragm pumping system, and the chemically-inert polymeric outer portion can protect the rigid insert from being damaged by a pumping fluid of concentrated aqueous NaOH.

Figure 1:
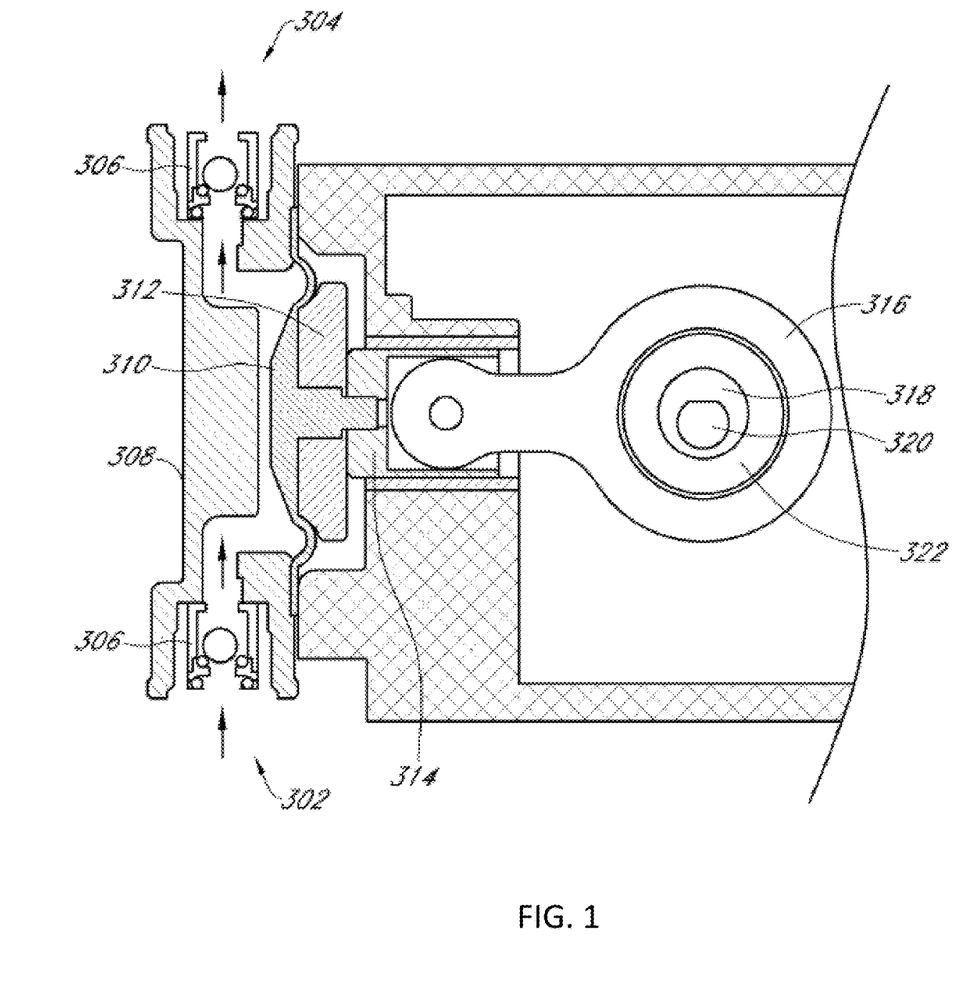
FIG. 1 illustrates a diaphragm pump in the prior art.

FIG. 1 illustrates a diaphragm system according to the prior art. As shown, there is an inlet 302 for receiving a pumping fluid and an outlet 304 for discharging the pumping fluid. Each of the inlet and outlet 302, 304 can have a one way check valve 306 to prevent the pumping fluid from back flowing. Between the inlet and outlet 302, 304 are a pump head 308 and a diaphragm 310 located on a washer 312. The washer 312 and/or diaphragm 310 can be attached to a piston 314 which produces suction between the inlet and outlet 302, 304. The piston is attached to a combination of pieces for moving the piston, such as a yoke assembly 316, cam 318, motor shaft 320, and bearing 322. In the illustrated diaphragm system, the diaphragm 310 can be repeatedly moved back and forth to create a vacuum within a chamber to input and output the pumping fluid. Therefore, the diaphragm 310 can experience cyclical forces acting on it, such as cyclical bending and cyclical pressure. Accordingly, a diaphragm made from a material with high strength, flexibility, and/or toughness may be helpful to prevent the diaphragm from fracturing, breaking, or cracking. As can be appreciated from FIG. 1, the washer 312 can reinforce the diaphragm 310 and reduce deformation of the diaphragm 310 during the suction and ejection phases of the pump stroke. Reducing the deformation of the diaphragm 310 can improve the accuracy and repeatability of the volume of pumping fluid that is delivered by the diaphragm pumping system.

Figure 2A:
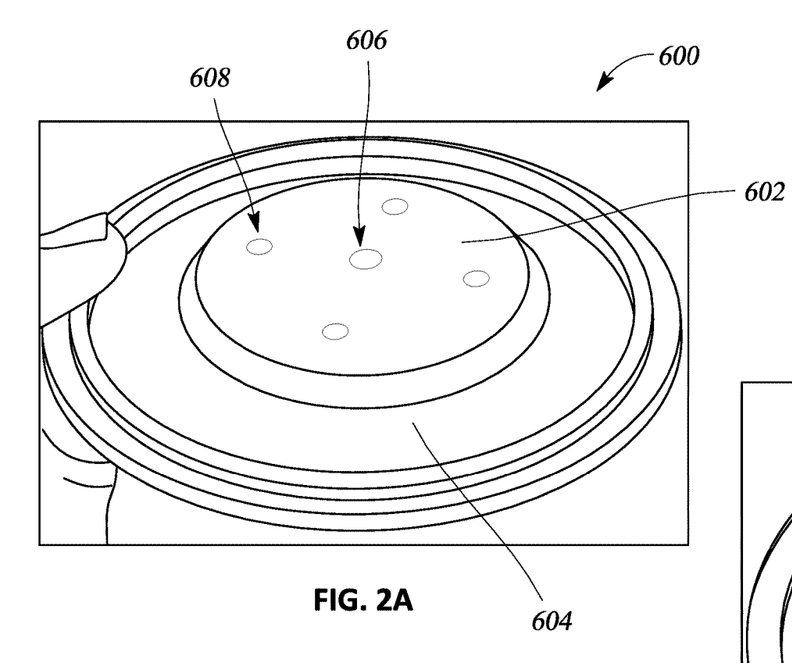
FIG. 2A illustrates a front view of a two-part diaphragm assembly according to some aspects of the present disclosure.
Figure 2B:
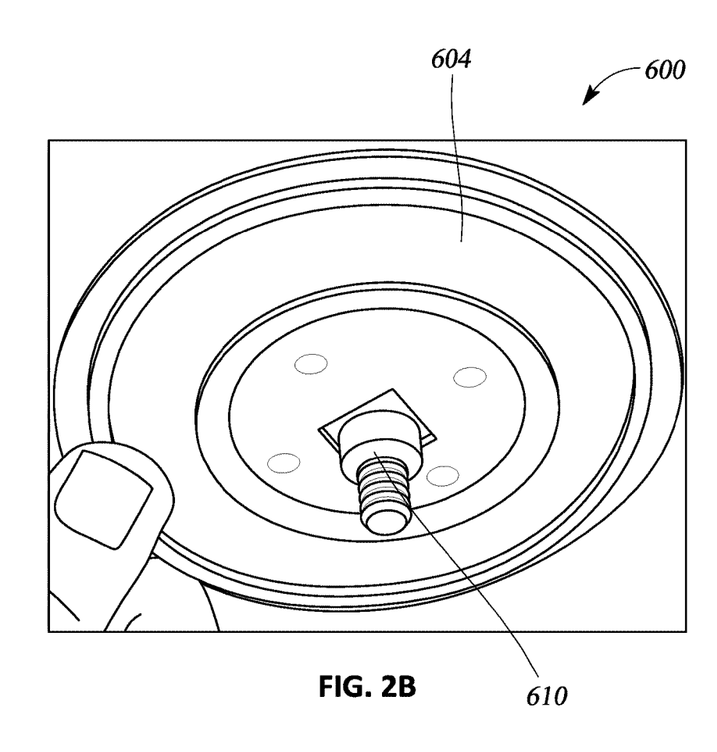
FIG. 2B illustrates a rear view of the two-part diaphragm assembly of FIG. 2A.

FIGS. 2A-2B illustrate a reinforced diaphragm assembly 600 according to some aspects of the present disclosure. As described herein, the diaphragm assembly 600 can improve the durability and pumping accuracy of a NaOH-pumping system. As shown, the diaphragm assembly 600 can be formed as a two-part assembly. In some aspects, there can be a rigid insert 602 that is surrounded by a polymer diaphragm 604. In some aspects, the rigid insert can be made of metal. The insert 602 can contain a tapped hole 606, or other interference surface 608 to improve adhesion between the insert 602 and the polymer diaphragm 604. As shown in FIG. 2B, the insert 602 can have a threaded portion 610 that extends through the back side of the polymer diaphragm 604. The threaded portion 610 can be configured to allow the diaphragm assembly 600 to be connected to the yoke 316 (FIG. 1) of a diaphragm system. Further details of a two-part diaphragm assembly are found in U.S. Pat. No. 10,330,094, filed on Aug. 22, 2014, entitled SEALING DIAPHRAGM AND METHODS OF MANUFACTURING SAID DIAPHRAGM, which is incorporated by reference herein in its entirety.

Figure 3:
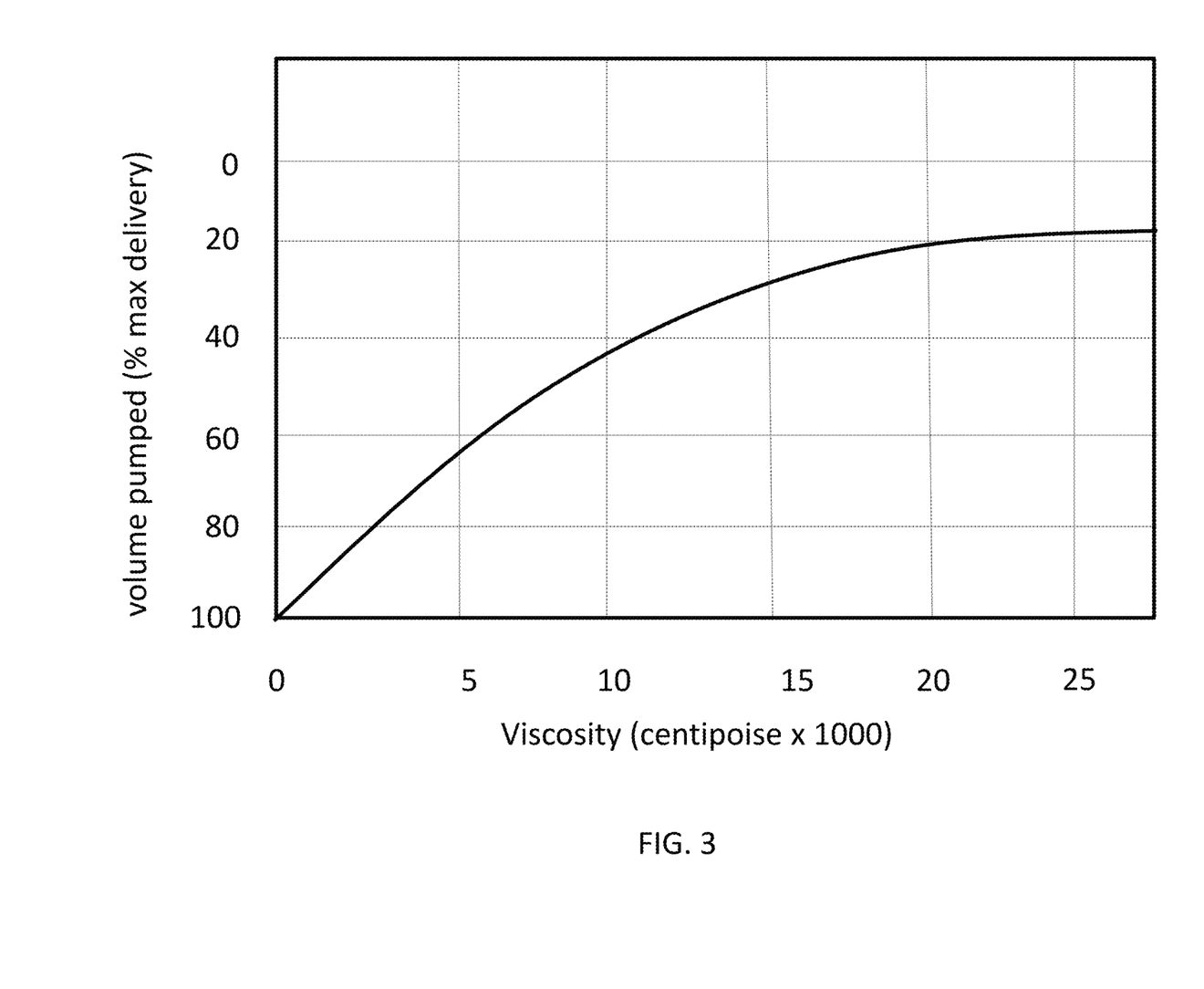
FIG. 3 illustrates the relationship between the pump output of a diaphragm system and the viscosity of the pumping fluid.

FIG. 3 illustrates that the performance of a diaphragm pump can be affected by the viscosity of the pumping fluid. Specifically, as the viscosity of the pumping fluid increases, the volumetric outflow the diaphragm pump can be reduced. In some aspects, the methods disclosed herein can improve the accuracy of a diaphragm pump by mitigating viscosity-based variations in the pump outflow. As shown in FIG. 3, the effect of the pumping fluid viscosity on the output of the diaphragm pumping system tends to plateau as viscosity of the pumping fluid exceeds 20 cP. Accordingly, increasing the viscosity of the pumping fluid to have a viscosity above 20 cP can mitigate or reduce pump outflow variations due to changes in the viscosity of the pumping fluid. In other words, by calibrating the diaphragm pump for use with a pumping fluid that has a viscosity of about or above 20 cP, the pump will remain near this calibration point even when the viscosity of the pumping fluid varies by 10% (i.e., +/−2 cP).

Figure 4:
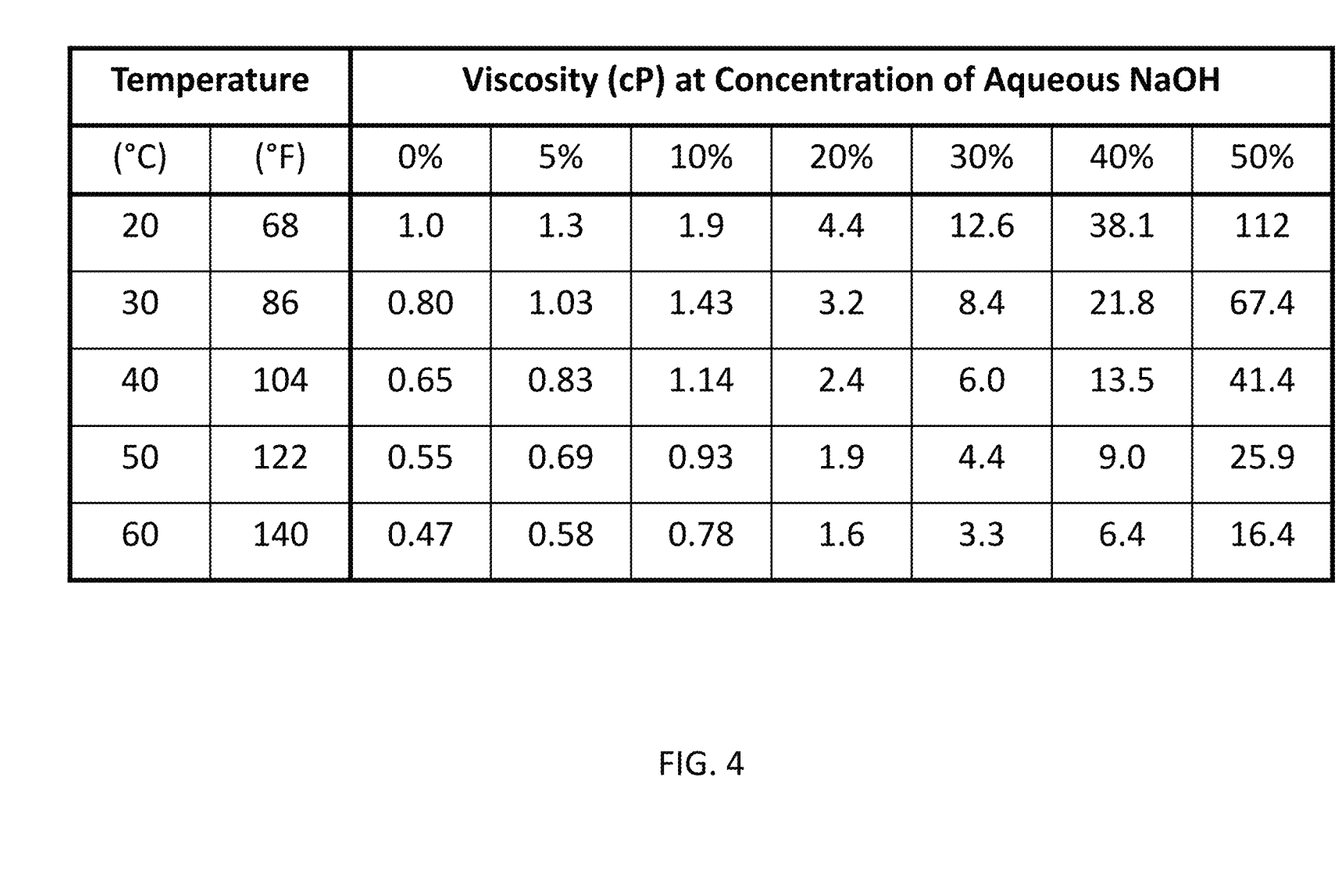
FIG. 4 illustrates the viscosity of an aqueous sodium hydroxide solution at different temperatures and sodium hydroxide concentrations.

FIG. 4 shows the viscosity a solution of water and NaOH for different concentrations of NaOH and different temperatures of the solution. As shown in FIG. 4, the viscosity of a solution of water and NaOH is highly dependent on the concentration of the NaOH in solution and the temperature of the solution. The viscosity of a 50% NaOH solution is about 112 cP at 20° C., while the viscosity of a 10% NaOH solution is about 2 cP at 20° C. A viscosity of 20 cP occurs within the plateau region of FIG. 3 and corresponds to a NaOH concentration of between 30% and 40% at 20 C. Accordingly, pumping a NaOH stock solution having a NaOH concentration slightly above 30% would mitigate variances in the pump outflow that can arise from small deviations in the viscosity of the pumping fluid. In some aspects, the viscosity of the pumping fluid can deviate from its expected value due to inaccuracies of the NaOH concentration or changes in the temperature of the pumping fluid.

FIG. 4 illustrates that the viscosity of aqueous NaOH can be inversely related to the temperature of the solution, and this temperature-based impact on the solution viscosity increases at greater concentrations of NaOH. For example, the viscosity of a 5% NaOH solution decreases by about 20% as the temperature of the solution increases from 30° C. to 40° C. while the viscosity of a 50% NaOH solution decreases by about 40%. Therefore, to keep the NaOH solution in the plateau range of pump performance (FIG. 3) despite slight temperature fluctuations of the solution, a higher concentration of NaOH can be used (e.g., 40%).

As discussed herein, the pumping systems of the present disclosure can deliver an accurate and predictable volume of a concentrated NaOH solution to a volume of water that is being treated with NaOH. In some aspects, the pumping system can include a diaphragm assembly 600 (FIG. 2A) comprising a polymer diaphragm 604 overmolded onto a metal insert 602. In some aspects, the polymer diaphragm 604 can be made of a material that can tolerate a NaOH concentration above 50% (e.g., 70% NaOH). In some aspects, the polymer diaphragm 604 can be made of a fully-vulcanized ethylene propylene diene monomer (EPDM) rubber (e.g., Santoprene™ 271-87). In some aspects, the NaOH solution can be pumped by the diaphragm pumping system by bringing the NaOH solution into contact with a fully-vulcanized EPDM rubber that has a density of 0.96 grams per cubic centimeter, a Shore Hardness (Shore A, 23° C.) of 93, a tensile stress at 100% (across flow, 23° C.) of 7.10 MPa, a tensile strength at break (across flow, 23° C.) of 17.6 MPa, an elongation at break (across flow, 23° C.) of 580%, a tear strength (across flow, 23° C., Die C) of 54 kN per meter, a compression set (70° C., 22 hour, Type 1) of 36%, a brittleness temperature of −54° C.

In some aspects, the two-part diaphragm assembly can be manufactured at least partially through the use of injection molding. In some aspects, the fully-vulcanized EPDM rubber can be suitable for injection molding. In some aspects, the two-part diaphragm assembly can be formed by over-molding the EPDM rubber over the rigid insert using injection molding. In some aspects, the injection molding conditions used to overmold the fully-vulcanized EPDM rubber over the rigid insert can be as follows: a drying temperature of 82° C., a drying time of 3.0 hours, a suggested maximum moisture of 0.080%, a suggested maximum regrind of 20%, a rear temperature of 182° C., a middle temperature of 188° C., a front temperature of 193° C., a nozzle temperature of 199 to 235° C., a process (melt) temperature of 204 to 232° C., a mold temperature of 10 to 52° C., a fast injection rate, a back pressure between 0.345 to 0.689 MPa, a screw speed between 100 to 200 rpm, a clamp tonnage between 41 to 69 MPa, a cushion between 3.18 to 6.35 mm, a screw L/D ratio between 16.0:1.0 to 20.0:1.0, a screw compression ratio between 2.0:1.0 to 2.5:1.0, and a vent depth of 0.025 mm.

Figure 5:
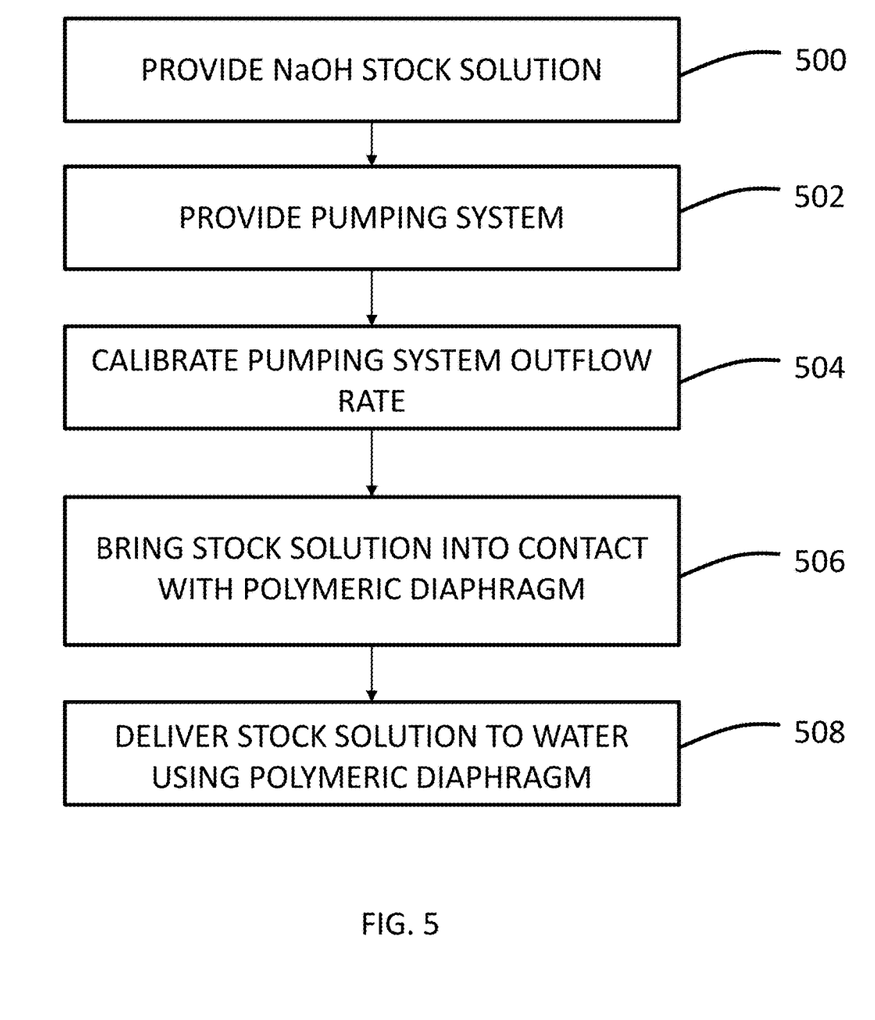
FIG. 5 illustrates a flow chart for a method of treating water with caustic soda.

FIG. 5 shows a schematic diagram of a method of treating a volume of water with an aqueous NaOH stock solution. The method can include a first step 500 of providing a NaOH stock solution having a NaOH concentration between 10% and 70% in water. The method can include a second step 502 of providing a pumping system that comprises a two-part diaphragm having a polymeric diaphragm overmolded onto a rigid insert. The method can include a third step 504 of calibrating the outflow rate of the pumping system for each of a plurality of operating conditions of the pumping system in order to determine the outflow rate of the pumping system at each of the plurality of operating conditions. In some aspects, the plurality of operating conditions can include: different operating speeds of the pumping system (e.g., different movement frequencies or movement speeds of the polymeric diaphragm); different temperatures of the pumping fluid; and different viscosities of the pumping fluid. In some aspects, the pumping system can be calibrated by bringing into contact with the polymeric diaphragm a NaOH stock solution in water. In some aspects, the pumping system can be calibrated by bringing into contact with the polymeric diaphragm a calibration fluid at a first fluid temperature, wherein the viscosity of the calibration fluid at the first fluid temperature matches the viscosity of the NaOH stock solution at the first fluid temperature. In some aspects, the calibration fluid is a NaOH stock solution in water. In some aspects, the calibration fluid is a solution other than a NaOH stock solution in water. In some aspects, the method can include a fourth step 506 of bringing a NaOH stock solution in water into contact with a polymeric diaphragm of the diaphragm system. The method can include a fifth step 508 of delivering the NaOH stock solution to the volume of water to be treated with NaOH using the polymeric diaphragm of the diaphragm pumping system. In some aspects, the method can include some but not all of the aforementioned steps. For example, in some aspects, the method does not include performing the third step 504 of calibrating the diaphragm system.

Although the foregoing description has shown, described, and pointed out the fundamental novel features of the present teachings, it will be understood that various omissions, substitutions, and changes in the form of the detail of the apparatus as illustrated, as well as the uses thereof, may be made by those skilled in the art, without departing from the scope of the present teachings. Consequently, the scope of the present teachings should not be limited to the foregoing discussion, but should be defined by the appended claims and their equivalents. Furthermore, while certain advantages of the inventions have been described herein, it is to be understood that not necessarily all such advantages may be achieved in accordance with any particular embodiment of the inventions. Thus, for example, those skilled in the art will recognize that the inventions may be embodied or carried out in a manner that achieves or optimizes one advantage or group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, or steps. Thus, such conditional language is not generally intended to imply that features, elements, or steps are in any way required for one or more embodiments or that one or more embodiments necessarily include logic for deciding, with or without user input or prompting, whether these features, elements, or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A method for treating drinking water, comprising:
providing a stock solution comprising water and sodium hydroxide, wherein the sodium hydroxide in the stock solution has a concentration of between 10% and 70%;
bringing the stock solution into contact with a fully-vulcanized ethylene propylene diene monomer (EPDM) rubber, wherein the EPDM rubber has a density of 0.96 grams per cubic centimeter, a Shore Hardness (Shore A, 23° C.) of 93, a tensile stress at 100% (across flow, 23° C.) of 7.10 MPa, a tensile strength at break (across flow, 23° C.) of 17.6 MPa, an elongation at break (across flow, 23° C.) of 580%, a tear strength (across flow, 23° C., Die C) of 54 kN per meter, a compression set (70° C., 22 hour, Type 1) of 36%, and a brittleness temperature of −54° C. to create a modified solution; and pumping the modified solution into a volume of the drinking water to treat the drinking water.

2. The method of claim 1, wherein the sodium hydroxide in the stock solution has the concentration of between 30% and 70%.

3. The method of claim 1, wherein the sodium hydroxide in the stock solution has the concentration of between 40% and 60%.

4. A method for treating drinking water, comprising:
providing a stock solution comprising water and sodium hydroxide, wherein the sodium hydroxide in the stock solution has a concentration of between 10% and 70%;
bringing the stock solution into contact with a polymeric diaphragm, wherein the polymeric diaphragm comprises a fully-vulcanized ethylene propylene diene monomer (EPDM) rubber overmolded onto a rigid insert to create a modified solution; and
pumping the modified solution to deliver a volume of the modified solution into a volume of the drinking water to treat the drinking water.

5. The method of claim 4, wherein the fully-vulcanized EPDM rubber overmolded onto the rigid insert has a density of 0.96 grams per cubic centimeter, a Shore Hardness (Shore A, 23° C.) of 93, a tensile stress at 100% (across flow, 23° C.) of 7.10 MPa, a tensile strength at break (across flow, 23° C.) of 17.6 MPa, an elongation at break (across flow, 23° C.) of 580%, a tear strength (across flow, 23° C., Die C) of 54 kN per meter, a compression set (70° C., 22 hour, Type 1) of 36%, and a brittleness temperature of −54° C. and the stock solution is brought into contact with the polymeric diaphragm to create the modified solution.

6. The method of claim 4, further comprising:
calibrating a pumping system that comprises the polymeric diaphragm, wherein the calibrating comprises: (i) pumping with the polymeric diaphragm a calibration solution at a plurality of operating conditions of the pumping system, and (ii) measuring a volumetric outflow of the pumping system for each of the plurality of operating conditions.

7. The method of claim 6, wherein the calibration solution has a viscosity that matches a viscosity of the stock solution.

8. The method of claim 6, wherein the calibration solution comprises the stock solution comprising the water and the sodium hydroxide.

9. The method of claim 4, wherein the concentration of the sodium hydroxide is between 30% and 70%.

10. The method of claim 4, wherein the concentration of the sodium hydroxide is between 40% and 60%.

* * * * *